United States Patent
Nolan

(10) Patent No.: US 7,211,340 B2
(45) Date of Patent: *May 1, 2007

(54) THIN FILM STRUCTURES PROVIDING STRONG BASAL PLANE GROWTH ORIENTATION AND MAGNETIC RECORDING MEDIA COMPRISING SAME

(75) Inventor: Thomas Patrick Nolan, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 10/765,208

(22) Filed: Jan. 28, 2004

(65) Prior Publication Data

US 2004/0258963 A1    Dec. 23, 2004

Related U.S. Application Data

(60) Provisional application No. 60/444,117, filed on Jan. 30, 2003.

(51) Int. Cl.
*G11B 5/66* (2006.01)

(52) U.S. Cl. ............ 428/831.2; 428/669; 428/671; 428/672; 428/673; 428/674; 428/675

(58) Field of Classification Search .......... None
See application file for complete search history.

(56) References Cited

U.S. PATENT DOCUMENTS

| | | | |
|---|---|---|---|
| 4,743,491 A | 5/1988 | Asada et al. |
| 5,536,585 A | 7/1996 | Futamoto et al. |
| 5,599,580 A | 2/1997 | Futamoto et al. |
| 5,626,970 A | 5/1997 | Hedgcoth |
| 5,685,958 A | 11/1997 | Futamoto et al. |
| 5,738,927 A | 4/1998 | Nakamura et al. |
| 5,759,681 A | 6/1998 | Hosoe et al. |
| 5,830,569 A | 11/1998 | Hikosaka et al. |
| 5,872,690 A | 2/1999 | Tadokoro et al. |
| 5,922,456 A | 7/1999 | Tanahashi et al. |
| 5,968,679 A | 10/1999 | Kobayashi et al. |
| 6,020,060 A | 2/2000 | Yoshida et al. |
| 6,126,760 A | 10/2000 | Oishi et al. |
| 6,183,893 B1 | 2/2001 | Futamoto et al. |
| 6,248,416 B1 | 6/2001 | Lambeth et al. |
| 6,428,906 B1 | 8/2002 | Wong et al. |
| 6,673,475 B2 | 1/2004 | Oikawa et al. |
| 6,794,028 B2 | 9/2004 | Uwazumi et al. |
| 7,067,206 B2 * | 6/2006 | Uwazumi et al. ........ 428/831.2 |

(Continued)

FOREIGN PATENT DOCUMENTS

WO    WO 99/24973    5/1999

*Primary Examiner*—Kevin M. Bernatz
(74) *Attorney, Agent, or Firm*—McDermott Will & Emery LLP

(57) ABSTRACT

A multiple layer structure comprising a pair of spaced-apart crystalline layers of different materials with an intermediate crystalline layer between and in contact with each of the pair of crystalline layers, the intermediate crystalline layer providing one of the crystalline layers of the pair with a stronger out-of-plane preferred growth orientation than if each of the pair of crystalline layers are in overlying contact. Disclosed and preferred embodiments include perpendicular magnetic recording media comprising the multiple layer structure as an intermediate layer structure beneath a perpendicular magnetic recording layer for strengthening a preferred out-of-plane growth orientation of the latter.

11 Claims, 2 Drawing Sheets

U.S. PATENT DOCUMENTS

2002/0058161 A1  5/2002  Yamamoto et al.
2002/0064691 A1  5/2002  Kanbe et al.
2003/0022023 A1  1/2003  Carey et al.
2004/0247943 A1* 12/2004 Girt et al. ................ 428/694 T
2004/0258962 A1* 12/2004 Nolan et al. .......... 428/694 BH

* cited by examiner

THIN FILM STRUCTURES PROVIDING STRONG BASAL PLANE GROWTH ORIENTATION AND MAGNETIC RECORDING MEDIA COMPRISING SAME

CROSS-REFERENCE TO PROVISIONAL APPLICATION

This application claims priority from U.S. provisional patent application Ser. No. 60/444,117 filed Jan. 30, 2003, the entire disclosure of which is incorporated herein by reference.

FIELD OF THE INVENTION

The present invention relates to thin film layer structures providing strong basal plane growth orientation of an overlying thin film layer and to magnetic recording media comprising same. The invention is of particular utility in the manufacture of high areal recording density perpendicular media, e.g., in the form of hard disks.

BACKGROUND OF THE INVENTION

The performance of many devices and manufactures comprised of multiple layer thin-film structures can be significantly improved by increasing the strength of a preferred crystalline growth orientation of at least an active layer of the multiple layer structure, e.g., a preferred hexagonal close-packed (hcp) <0002> or face-centered cubic (fcc) <111> out-of-plane growth orientation of the active layer. For example, when fabricating high areal recording density perpendicular magnetic recording media (described in detail below), it is frequently desirable to deposit well-oriented, i.e., out-of-plane oriented, (hcp) <0002> and (fcc) <111> layers in the same thin-film structure.

According to conventional practice, an upper layer is grown in an oriented fashion on a lower layer by a coherent growth mechanism. Unfortunately, however, coherent growth of the upper layer on the lower layer requires the former layer to be chemically compatible with the latter layer, with substantially similar crystal lattice structure and atomic interplanar spacings (lattice parameters), since materials with sufficiently different crystal structures and lattice parameters do not grow coherently one upon-the-other, disadvantageously resulting in loss of preferred growth orientation. Specifically, loss of a desired preferred crystallographic growth orientation of the active magnetic recording layer of a perpendicular magnetic recording medium often results in undesired, deleterious change in the crystal grain structure and size, in turn manifesting in reduced or degraded media performance characteristics, e.g., magnetic anisotropy (Ku) and coercivity ($H_c$).

The above-mentioned magnetic media are widely used in various applications, particularly in the computer industry for data/information storage and retrieval, and efforts are continually made with the aim of increasing the areal recording density, i.e., bit density of the magnetic media. Conventional thin-film type magnetic recording media, wherein a fine-grained polycrystalline magnetic alloy serves as the active recording layer, are generally classified as "longitudinal" or "perpendicular", depending upon the orientation of the magnetic domains of magnetic material. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that an efficient, high bit density perpendicular magnetic medium requires interposition of a relatively thick (as compared to the magnetic recording layer), magnetically "soft" underlayer or "keeper" layer, i.e., a magnetic layer having a relatively low coercivity below 1 kOe, such as Permalloy (a NiFe alloy, between the non-magnetic substrate (e.g., of glass, aluminum (Al) or an Al-based alloy), and the "hard" magnetic recording layer having a relatively high coercivity of several kOe, typically about 4–7 kOe (e.g., of a cobalt-based alloy such as CoCrPtB) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical conventional perpendicular recording system 10 utilizing a vertically oriented magnetic medium 1 with a relatively thick soft magnetic underlayer, a relatively thin hard magnetic recording layer, and a single-pole head, is schematically illustrated in FIG. 1, wherein reference numerals 2, 3, 4, and 5, respectively, indicate a non-magnetic substrate, a soft magnetic underlayer, at least one non-magnetic interlayer, and a perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer.

As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 5 in the region below single pole 7, entering and travelling along soft magnetic underlayer 3 for a distance, and then exiting therefrom and passing through the perpendicular hard magnetic recording layer 5 in the region below auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. In the figure, the width of the grains (as measured in a horizontal direction) of each of the polycrystalline layers constituting the layer stack of the medium is shown as being substantially the same, i.e., each overlying layer may replicate the grain width of the underlying layer. A protective overcoat layer 11, such as of a diamond-like carbon (DLC) is formed over hard magnetic layer 5, and a lubricant topcoat layer 12, such as of a perfluoropolyethylene material, is formed over the protective overcoat layer. Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials. Underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, FeCoC, FeCoB, etc. Interlayer 4 typically comprises an up to about 300 Å thick layer of a non-magnetic material, such as TiCr. Hard magnetic layer 5 is typically comprised of an about 50 to about 250 Å thick layer of a Co-based alloy including one or more elements selected from the group consisting of Cr, Fe, Ta, Ti, Ni, Mo, Pt, V, Nb, Ge, B, Si, 0, and Pd; iron nitrides or oxides; or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is about 10 Å thick. Each type of hard magnetic recording layer material has perpendicular anisotropy arising from magneto-crystalline anisotropy ($1^{st}$ type) and/or interfacial anisotropy ($2^{nd}$ type).

Notwithstanding the improvement (i.e., increase) in areal recording density and SMNR afforded by perpendicular magnetic recording media as described supra, the escalating requirements for increased areal recording density, media stability and SMNR necessitate further improvement in media performance.

As indicated above, perpendicular magnetic recording media typically include a magnetically soft underlayer for guiding magnetic flux through the media and to enhance writability, a thin intermediate or interlayer, and a main recording layer. The role of the intermediate or interlayer (or multiple layer structure) is critical for obtaining good media performance. Specifically, in perpendicular magnetic recording media the intermediate or interlayer (or multiple layer interlayer structure) serves to provide:

1. control of the crystallographic orientation of the main recording layer;
2. control of the grain size and grain distribution of the main recording layer; and
3. physical separation between adjacent grains of the main recording layer, which feature is particularly desirable and important when the latter is formed by a low temperature and/or reactive sputtering process, so that growth of an oxide (e.g., Co-oxide or Si-oxide) occurs in the boundaries between adjacent grains.

More specifically, the SMNR of perpendicular magnetic recording media is improved by increasing the strength of the preferred c-axis out-of-plane orientation of the perpendicular main recording layer while maintaining a small uniform grain size of the layer. The preferred orientation of the magnetic layer depends upon the structural properties of and the interactions between the various previously deposited underlying layers of the media, as well as upon the nature of the substrate.

In general, control of the strength (or amount) of the preferred orientation of thin-film layers is difficult, for the reasons given above. Specifically, formation of a Co-alloy perpendicular magnetic recording layer with a strong <0002> growth orientation on a structure including a substrate, a soft magnetic underlayer, and non-magnetic intermediate or underlayer(s) between about 0.2 and 400 nm thick is extremely difficult.

As indicated supra, differences in crystallographic orientation between adjacent (e.g., lower and upper) thin film layers are caused by differences in the surface and interfacial energies of the materials of the layers, and by heteroepitaxial (or coherent) growth of one layer upon another layer of a chemically distinct material with different crystal lattice structure and atomic interplanar spacings.

The soft magnetic underlayer of perpendicular magnetic recording media is generally composed of a small grain or amorphous material containing at least one of Fe and Co. According to prior practice, a non-magnetic material of hcp structure, e.g., Ru, may be deposited on the soft magnetic underlayer, which non-magnetic hcp material grows with a moderately strong <0002> preferred orientation and small grain size. A magnetic material of hcp structure, typically a Co-based alloy, may grow coherently on the hcp non-magnetic layer, also with <0002> growth orientation and small grain size. The quality of the <0002> growth orientation can be determined from the size of symmetric X-ray diffraction peaks and X-ray rocking curves. Strong preferred growth orientation of the Co-based alloy with the hcp <0002> axis out-of-plane is generally necessary for achieving good performance of high areal recording density perpendicular magnetic media. Unfortunately, however, the quality of growth orientation of an hcp material upon the soft magnetic underlayer depends upon the selected material, and prior intermediate or underlayer structures, such as with a Ru layer and a Co-alloy layer, generally have not afforded the desired strength of <0002> growth orientation.

In view of the foregoing critical nature of the intermediate or interlayer in perpendicular magnetic recording media, there exists a clear need for improved layer structures for facilitating highly oriented crystal growth thereon and, more particularly, for highly oriented perpendicular magnetic recording media with enhanced performance characteristics, comprising improved intermediate or interlayer structures.

The present invention, therefore, addresses and solves problems attendant upon the design and manufacture of improved layer structures for facilitating highly oriented crystal growth and, in particular, fabrication of high performance, ultra-high areal recording density perpendicular magnetic recording media, while maintaining full compatibility with the economic requirements of cost-effective, large-scale automated manufacturing technology.

DISCLOSURE OF THE INVENTION

An advantage of the present invention is an improved crystalline thin-film multiple layer structure for strengthening a preferred out-of-plane growth orientation of one of a pair of spaced-apart crystalline layers.

Another advantage of the present invention is an improved crystalline thin-film multiple layer structure for strengthening a preferred out-of-plane growth orientation of a crystalline layer formed thereon.

Yet another advantage of the present invention is an improved crystalline thin-film multiple layer structure useful as an intermediate layer structure for strengthening a preferred out-of-plane growth orientation of a hexagonal close-packed (hcp) <0002> or face-centered cubic (fcc) <111> perpendicular magnetic recording layer formed thereon as part of a recording medium.

Still another advantage of the present invention is an improved perpendicular magnetic recording medium comprising an improved crystalline thin-film, multiple layer intermediate layer structure for strengthening a preferred out-of-plane growth orientation of a hexagonal close-packed (hcp) <0002> or face-centered cubic (fcc) <111> perpendicular magnetic recording layer formed thereon as part of the recording medium.

These and additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a multiple layer structure, comprising a pair of spaced-apart crystalline layers of different materials with an intermediate crystalline layer between and in contact with each of the pair of crystalline layers, the intermediate crystalline layer providing one of the crystalline layers of the pair with a stronger out-of-plane preferred growth orientation than if each of the pair of crystalline layers are in overlying contact.

According to embodiments of the invention, the multiple layer structure comprises, in overlying, contacting sequence:

(a) a first crystalline layer of a material having a first crystal structure, a first preferred growth orientation and a first, closest packed plane, nearest neighbor atomic spacing;

(b) an intermediate layer in the form of a second crystalline layer of a material having a second crystal structure, a second preferred growth orientation, and a second, closest packed plane, nearest neighbor atomic spacing; and (c) a third crystalline layer of a material having a third crystal structure, a third preferred growth orientation, and a third closest packed plane, nearest neighbor atomic spacing, wherein:

(1) the first and said third crystal structures are different;
(2) the first and the third closest packed plane, nearest neighbor atomic spacings are different;
(3) the second crystal structure is of the same type as one of the first and said third crystal structures; and
(4) the atomic spacing mismatch between the second closest packed plane, nearest neighbor atomic spacing of the second crystalline layer and the closest packed plane, nearest neighbor atomic spacing of one of the first and third crystalline layers having a crystal structure different from that of the second crystalline layer is less than the mismatch between the closest packed plane, nearest neighbor atomic spacings of the first and third crystalline layers, whereby:

the third crystalline layer in overlying contact with the second crystalline layer has a stronger preferred out-of-plane growth orientation than if the third crystalline layer is in overlying contact with the first crystalline layer.

Preferred embodiments of the multiple layer structure according to the invention include those wherein the third crystalline layer in overlying contact with the second crystalline layer has a stronger preferred hexagonal close-packed (hcp) <0002> or face-centered cubic (fcc) <111> out-of-plane growth orientation than if the third crystalline layer is in overlying contact with the first crystalline layer.

According to a first preferred embodiment of the present invention:

the first crystalline layer comprises a first fcc material having a <111> preferred growth orientation and a first {111} lattice parameter;

the second crystalline layer comprises a second fcc material having a <111> preferred growth orientation and a second {111} lattice parameter different from the first {111} lattice parameter; and the third crystalline layer comprises an hcp material having a <0002> preferred growth orientation and a {0002} lattice parameter more closely matched to the second {111} lattice parameter than to the first {111} lattice parameter, wherein:

the first crystalline layer is from about 1 to about 1,000 nm thick and comprised of a first fcc material selected from the group consisting of: Ag, Cu, Au, Ni, Pt, Pd, Al, Rh, Ir, Pb, Ca, Sr, Yb, and alloys based thereon;

the second crystalline layer is from about 1 to about 50 nm thick and comprised of a second fcc material selected from the group consisting of: Ag, Cu, Au, Ni, Pt, Pd, Al, Rh, Ir, Pb, Ca, Sr, Yb, and alloys based thereon; and the third crystalline layer is from about 1 to about 50 nm thick and comprised of an hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon.

According to a second preferred embodiment of the present invention:

the first crystalline layer comprises an fcc material having a <111> preferred growth orientation and a {111} lattice parameter;

the second crystalline layer comprises a first hcp material having a <0002> preferred growth orientation and a first {0002} lattice parameter substantially matched to the {111} lattice parameter; and the third crystalline layer comprises a second hcp material having a <0002> preferred growth orientation and a second {0002} lattice parameter different from the first {0002} lattice parameter, wherein:

the first crystalline layer is from about 1 to about 1,000 nm thick and comprised of an fcc material selected from the group consisting of: Ag, Cu, Au, Ni, Pt, Pd, Al, Rh, Ir, Pb, Ca, Sr, Yb, and alloys based thereon;

the second crystalline layer is from about 1 to about 50 nm thick and comprised of a first hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, and alloys based thereon; and the third crystalline layer is from about 1 to about 50 nm thick and comprised of a second hcp material selected from the group consisting of: CoCrPt alloys or from the group consisting of: Ru, Ti, Co, Re, Be, Mg, Sc, Zn, Se, Zr, Cd, Te, La, Hf, Os, Ti, Pr, Nd, Gd, Tb, Dy, Ho, Er, Tm, Lu, Y, and alloys based thereon.

According to a third preferred embodiment of the present invention:

the first crystalline layer comprises an hcp material having a <0002> preferred growth orientation and a {0002} lattice parameter;

the third crystalline layer comprises a first fcc material having a <111> preferred growth orientation and a second {111} lattice parameter different from the first {111} lattice parameter; and the second crystalline layer comprises a second fcc material having a <111> preferred growth orientation and a second {111} lattice parameter more closely matched to the {0002} lattice parameter than to the first {111} lattice parameter, wherein:

the first crystalline layer is from about 1 to about 1,000 nm thick and comprised of an hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon;

the second crystalline layer is from about 1 to about 50 nm thick and comprised of a first fcc material selected from the group consisting of: Ag, Cu, Au, Ni, Pt, Pd, Al, Rh, Ir, Pb, Ca, Sr, Yb, and alloys based thereon; and the third crystalline layer is from about 1 to about 50 nm thick and comprised of a second fcc material selected from the group consisting of: Ag, Cu, Au, Ni, Pt, Pd, Al, Rh, Ir, Pb, Ca, Sr, Yb, and alloys based thereon.

According to a fourth preferred embodiment of the present invention:

the first crystalline layer comprises a first hcp material having a <0002> preferred growth orientation and a first {0002} lattice parameter;

the second crystalline layer comprises a second hcp material having a <0002> preferred growth orientation and a second {0002} lattice parameter different from the first {0002} lattice parameter; and the third crystalline layer comprises an fcc material having a <111> preferred growth orientation and a {111} lattice parameter more closely matched to the second {0002} lattice parameter than to the first {0002} lattice parameter, wherein:

the first crystalline layer is from about 1 to about 1,000 nm thick and comprised of a first hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon;

the second crystalline layer is from about 1 to about 50 nm thick and comprised of a second hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon; and the third crystalline layer is from about 1 to about 50 nm thick and comprised of an fcc material selected from the group consisting of: Ag, Cu, Au, Ni, Pt, Pd, Al, Rh, Ir, Pb, Ca, Sr, Yb, and alloys based thereon.

Another aspect of the present invention is a perpendicular magnetic recording medium, comprising the above-described multiple layer structure and a perpendicular magnetic recording layer comprising a magnetic material with a strong preferred hcp <0002> or fcc <111> out-of-plane growth orientation in overlying contact with said one layer of said pair of layers having said strong preferred hcp <0002> or fcc <111> out-of-plane growth orientation, wherein:

the perpendicular magnetic recording layer comprises at least one magnetic material with a strong hcp <0002> out-of-plane growth orientation, selected from the group consisting of: Co-based alloys, CoCrPt(SiO$_2$), other CoPtO-containing alloys, CoCrPtB, other CoCrPt-containing alloys, and other ordered or disordered Co-based alloys, or at least one magnetic material with a strong fcc <111> out-of-plane growth orientation, selected from the group consisting of a multi-layer superlattice structure including a bi-layer comprising a Co-based alloy layer and a layer including at least one of Pt and Pd, a multi-layer superlattice structure including a bi-layer comprising an Fe-based alloy layer and a layer including at least one of Pt and Pd, and an L$_{10}$ structure selected from FePt, CoPt, FePd, and CoPd materials with and without at least one alloying element.

Yet another aspect of the present invention is a perpendicular magnetic recording medium, comprising:

(a) a non-magnetic substrate having a surface;

(b) a layer stack formed over the substrate surface, the layer stack comprising, in overlying sequence from the substrate surface:

(i) a magnetically soft underlayer;

(ii) a multiple layer interlayer structure for strengthening a preferred out-of-plane growth orientation of a layer of a perpendicular magnetic recording material formed thereon; and (iii) a perpendicular magnetic recording layer having a strong preferred hcp <0002> or fcc <111> out-of-plane growth orientation;

wherein the multiple layer interlayer structure comprises, in overlying, contacting sequence from a surface of the magnetically soft underlayer:

(1) a first crystalline layer of a material having a first crystal structure, a first preferred growth orientation and a first, closest packed plane, nearest neighbor atomic spacing;

(2) an intermediate layer in the form of a second crystalline layer of a material having a second crystal structure, a second preferred growth orientation, and a second, closest packed plane, nearest neighbor atomic spacing; and (3) a third crystalline layer of a material having a third crystal structure, a third preferred growth orientation, and a third closest packed plane, nearest neighbor atomic spacing, wherein:

(I) the first and said third crystal structures are different;

(II) the first and third closest packed plane, nearest neighbor atomic spacings are different;

(III) the second crystal structure is of the same type as one of the first and third crystal structures; and (IV) the atomic spacing mismatch between the second closest packed plane, nearest neighbor atomic spacing of the second crystalline layer and the closest packed plane, nearest neighbor atomic spacing of one of the first and third crystalline layers having a crystal structure different from that of the second crystalline layer is less than the mismatch between the closest packed plane, nearest neighbor atomic spacings of the first and third crystalline layers, whereby:

the third crystalline layer in overlying contact with the second crystalline layer has a stronger preferred out-of-plane growth orientation than if the third crystalline layer is in overlying contact with the first crystalline layer, and preferred embodiments of perpendicular magnetic recording media according to the invention each comprise one of the four above-described preferred embodiments of the multiple layer structure of the invention.

Preferred embodiments of perpendicular magnetic recording media according to the invention include those wherein:

the non-magnetic substrate comprises at least one material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof;

the magnetically soft underlayer comprises at least one material selected from the group consisting of Fe-based alloys, Co-based alloys, and Ni-based alloys; and the perpendicular magnetic recording layer comprises at least one magnetic material with a strong hcp <0002> out-of-plane growth orientation, selected from the group consisting of: Co-based alloys, CoCrPt(SiO$_2$), other CoPtO-containing alloys, CoCrPtB, other CoCrPt-containing alloys, and other ordered or disordered Co-based alloys, or at least one magnetic material with a strong fcc <111> out-of-plane growth orientation, selected from the group consisting of a multi-layer superlattice structure including a bi-layer comprising a Co-based alloy layer and a layer including at least one of Pt and Pd, a multi-layer superlattice structure including a bi-layer comprising an Fe-based alloy layer and a layer including at least one of Pt and Pd, and an L$_{10}$ structure selected from FePt, CoPt, FePd, and CoPd materials with and without at least one alloying element.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition by the inventor that very high areal recording density perpendicular magnetic recording media which utilize magnetic alloys as the material of the perpendicular main recording layer, e.g., hcp Co-based alloys (e.g., CoCr alloys) with strong <0002> preferred out-of-plane growth orientation or fcc CoPt or FePt alloys or multi-layer structures with strong <111> preferred out-of-plane growth orientation, can be reliably and controllably fabricated with optimum crystallographic properties (e.g., growth orientation), grain size, and separation of adjacent grains of the main recording layer, by appropriate design and selection of materials of a multiple layer interlayer structure positioned between the magnetically soft underlayer and the magnetically hard main recording layer.

A feature, therefore, of the present invention, is selection of materials and arrangement of a plurality of stacked layers of different materials for forming improved interlayer structures which provide:

1. improved control and increased strength of the preferred crystallographic orientation of the main recording layer, e.g., <0002> in the case of hcp Co-based alloys and <111> in the case of fcc Co and Fe alloys, e.g., CoPt and FePt alloys;

2. improved control of the grain size (preferably small) and grain distribution of the main recording layer; and 3. improved physical separation between adjacent grains of the main recording layer, which feature is particularly desirable and important when the latter is formed by a low temperature and/or reactive sputtering process, so that growth of Co-oxide occurs in the boundaries between adjacent grains.

Another feature of the present invention is provision of an intermediate layer between a pair of fcc and hcp layers of a multiple layer interlayer structure, wherein at least one of the lattice parameter and crystal structure of the intermediate layer is (are) substantially matched with the fcc and hcp layers to facilitate coherent growth (e.g., along the basal plane normal) of the layers one upon-the-other. In addition, the intermediate layer is chemically compatible with and a sufficiently low interface energy with the fcc and hcp layers to form smooth, defect-free interfaces therewith, and has a lower melting temperature than the materials of the fcc and hcp layers.

The expression "substantially matched" as employed above and throughout the present specification and claims refers to instances wherein the lattice parameter, i.e., atomic spacing, of one layer of a pair of adjacent crystalline layers is within a fraction of an Angstrom (Å) of the other layer of the pair of adjacent crystalline layers, and the arrangements of the constituent atoms and their crystal lattice planes of each of the layers are similar.

Figure 1:
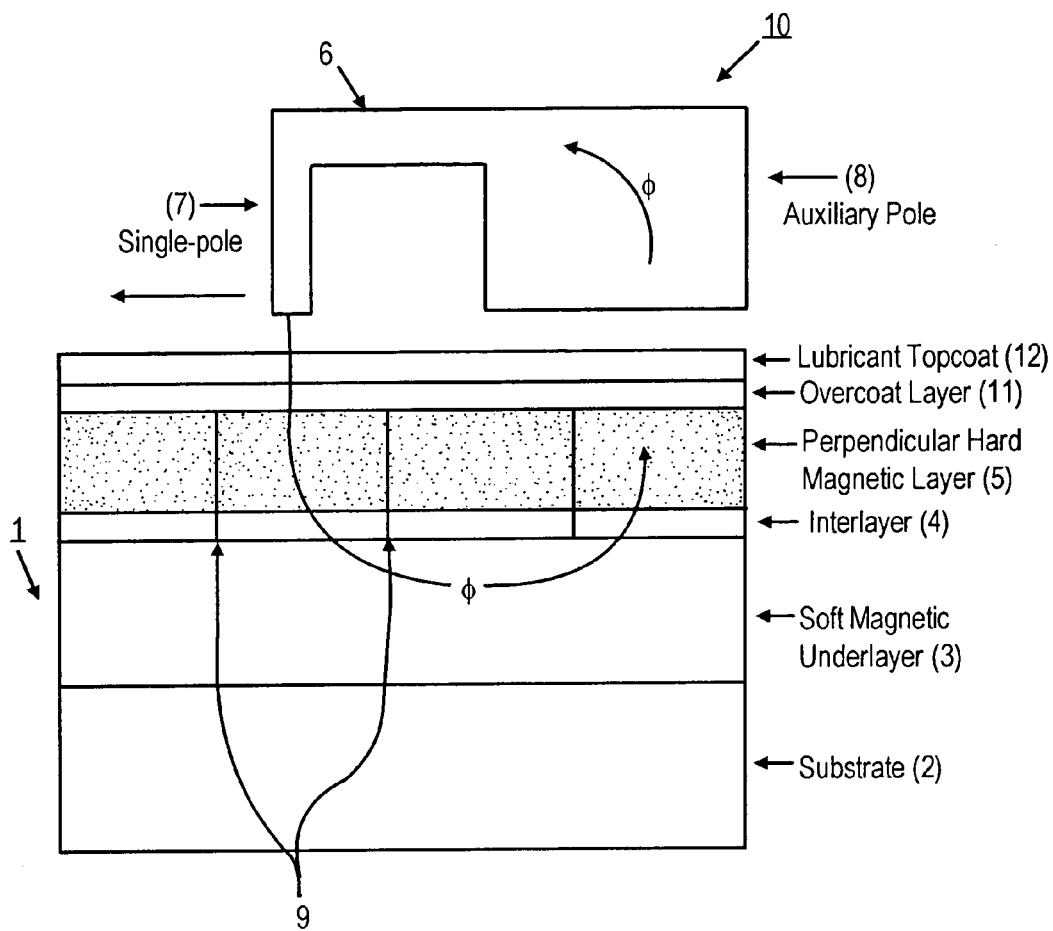
FIG. 1 schematically illustrates, in simplified cross-sectional view, a portion of a magnetic recording, storage, and retrieval system comprised of a single-pole transducer head and a conventional perpendicular type magnetic recording medium including a soft magnetic underlayer, an interlayer, and a perpendicular recording layer.
Figure 2:
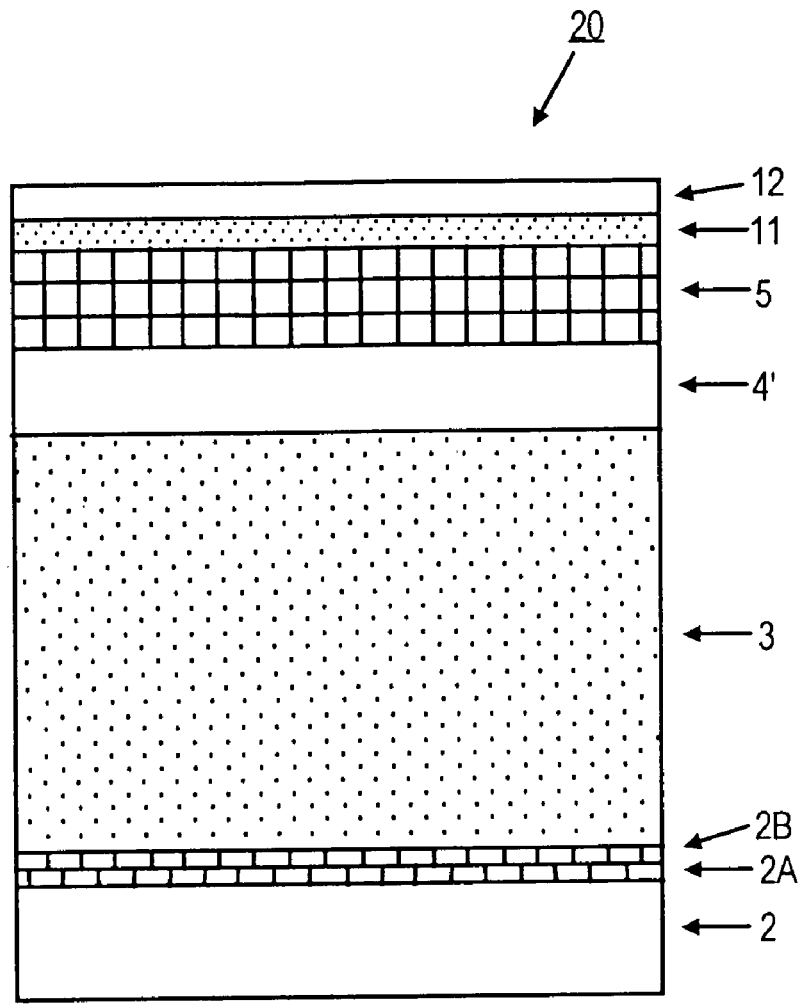
FIG. 2 schematically illustrates, in simplified cross-sectional view, a portion of a perpendicular magnetic recording medium including an improved interlayer structure according to the invention.

Referring now to FIG. 2, schematically illustrated therein, in simplified cross-sectional view, is a portion of a perpendicular magnetic recording medium 20 fabricated according to the principles of the present invention. More specifically, perpendicular magnetic recording medium 20 resembles the conventional perpendicular magnetic recording medium 1 of FIG. 1, and comprises a series of thin-film layers arranged in an overlying (stacked) sequence on a suitable non-magnetic substrate 2, and includes a soft magnetic underlayer 3, a non-magnetic interlayer structure 4' according to the present invention, a perpendicularly oriented, magnetically hard (main) recording layer 5, a protective overcoat layer 11, and a lubricant topcoat layer 12.

In accordance with embodiments of the present invention, e.g., as with hard disks, the non-magnetic substrate 2 is sufficiently thick as to provide medium 20 with a desired rigidity and comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer 2A and an adhesion layer 2B. A suitable material for plating layer 2A, as when substrate 2 is comprised of Al or an Al alloy such as Al—Mg, is amorphous NiP, and suitable materials for adhesion layer 2B include Cr, CrTi, Ti, and TiNb.

Overlying substrate 2 is a magnetically soft underlayer 3, from about 10 to about 400 nm thick, preferably from about 40 to about 200 nm thick, comprised of Fe containing at least one element selected from the group consisting of Co, B, P, Si, C, Zr, Nb, Hf, Ta, Al, Cu, Ag, and Au.

Non-magnetic interlayer structure 4' according to the present invention is interposed between the magnetically soft underlayer 3 and the magnetically hard (main) perpendicular recording layer 5 and is described in detail below.

Magnetically hard perpendicular recording layer 5 is from about 3 to about 50 nm thick, preferably from about 5 to about 25 nm thick, and typically includes at least one layer of an hcp ferromagnetic alloy material with a strong <0002> preferred out-of-plane growth orientation, selected from the group consisting of: Co-based alloys, CoCrPt(SiO$_2$), other CoPtO-containing alloys, CoCrPtB, other CoCrPt-containing alloys, and other ordered or disordered Co-based alloys, or at least one magnetic material with a strong fcc <111> out-of-plane growth orientation, selected from the group consisting of a multi-layer superlattice structure including a bi-layer comprising a Co-based alloy layer and a layer including at least one of Pt and Pd, a multi-layer superlattice structure including a bi-layer comprising an Fe-based alloy layer and a layer including at least one of Pt and Pd, and an $L_{10}$ structure selected from FePt, CoPt, FePd, and CoPd materials with and without at least one alloying element.

Completing the layer stack of medium 20 are protective overcoat layer 11 atop recording layer 5, typically a layer of a carbon-containing material <100 Å thick, and a lubricant topcoat layer 12 atop the protective overcoat layer 11, typically a layer of a fluorine-containing material <20 Å thick.

According to the invention, interlayer 4' overlying the magnetically soft underlayer 3 is a multiple layer structure which, inter alia, promotes the strong out-of-plane growth orientation of the perpendicular recording layer 5, e.g., the aforementioned hcp materials with a strong <0002> preferred out-of-plane growth orientation or the aforementioned fcc materials with a strong <111> preferred out-of-plane growth orientation, and comprises a pair of spaced-apart crystalline layers of different materials with an intermediate crystalline layer between and in contact with each of the pair of crystalline layers, wherein the intermediate crystalline layer provides the upper crystalline layer of the pair (i.e., the layer closer to overlying perpendicular magnetic recording layer 5) with a stronger out-of-plane preferred growth orientation than if each of the pair of crystalline layers are in overlying contact.

The intermediate crystalline layer of multiple layer interlayer structure 4' has the following attributes according to the invention:

(i) a lattice parameter and crystal structure which are substantially matched to the corresponding crystal parameters of the pair of spaced-apart crystalline layers so as to provide coherent growth of the one layer; and (ii) a lower value of interfacial energy with each of the pair of layers than the value of the interfacial energy between the pair of layers.

According to embodiments of the present invention, the multiple layer structure 4' comprises, in overlying, contacting sequence:

a pair of spaced-apart crystalline layers of different materials with an intermediate crystalline layer between and in contact with each of the pair of crystalline layers, the intermediate crystalline layer providing one of the crystalline layers of the pair with a stronger out-of-plane preferred growth orientation than if each of the pair of crystalline layers are in overlying contact.

According to embodiments of the invention, the multiple layer structure 4' comprises, in overlying, contacting sequence:

(a) a first crystalline layer of a material having a first crystal structure, a first preferred growth orientation and a first, closest packed plane, nearest neighbor atomic spacing;

(b) an intermediate layer in the form of a second crystalline layer of a material having a second crystal structure, a second preferred growth orientation, and a second, closest packed plane, nearest neighbor atomic spacing; and (c) a third crystalline layer of a material having a third crystal structure, a third preferred growth orientation, and a third closest packed plane, nearest neighbor atomic spacing, wherein:

(1) the first and said third crystal structures are different;
(2) the first and the third closest packed plane, nearest neighbor atomic spacings are different;
(3) the second crystal structure is of the same type as one of the first and said third crystal structures; and
(4) the atomic spacing mismatch between the second closest packed plane, nearest neighbor atomic spacing of the second crystalline layer and the closest packed plane, nearest neighbor atomic spacing of one of the first and third crystalline layers having a crystal structure different from that of the second crystalline layer is less than the mismatch between the closest packed plane, nearest neighbor atomic spacings of the first and third crystalline layers, whereby:

the third crystalline layer in overlying contact with the second crystalline layer has a stronger preferred out-of-plane growth orientation than if the third crystalline layer is in overlying contact with the first crystalline layer.

Preferred embodiments of the multiple layer structure 4' according to the invention include those wherein the third crystalline layer in overlying contact with the second crystalline layer has a stronger preferred hexagonal close-packed (hcp) <0002> or face-centered cubic (fcc) <111> out-of-plane growth orientation than if the third crystalline layer is in overlying contact with the first crystalline layer.

According to a first preferred embodiment of the present invention:

the first crystalline layer comprises a first fcc material having a <111> preferred growth orientation and a first {111} lattice parameter;

the second crystalline layer comprises a second fcc material having a <111> preferred growth orientation and a second {111} lattice parameter different from the first {111} lattice parameter; and the third crystalline layer comprises an hcp material having a <0002> preferred growth orientation and a {0002} lattice parameter more closely matched to the second {111} lattice parameter than to the first {111} lattice parameter, wherein:

the first crystalline layer is from about 1 to about 1,000 nm thick and comprised of a first fcc material selected from the group consisting of: Ag, Cu, Au, Ni, Pt, Pd, Al, Rh, Ir, Pb, Ca, Sr, Yb, and alloys based thereon;

the second crystalline layer is from about 1 to about 50 nm thick and comprised of a second fcc material selected from the group consisting of: Ag, Cu, Au, Ni, Pt, Pd, Al, Rh, Ir, Pb, Ca, Sr, Yb, and alloys based thereon; and the third crystalline layer is from about 1 to about 50 nm thick and comprised of an hcp material selected from the group consisting of: Ru, Ti, Co, Re, Be, Mg, Sc, Zn, Se, Zr, Cd, Te, La, Hf, Os, Tl, Pr, Nd, Gd, Th, Dy, Ho, Er, Tm, Lu, Y, and alloys based thereon.

According to a second preferred embodiment of the present invention:

the first crystalline layer comprises an fcc material having a <111> preferred growth orientation and a {111} lattice parameter;

the second crystalline layer comprises a first hcp material having a <0002> preferred growth orientation and a first {0002} lattice parameter substantially matched to the {111} lattice parameter; and the third crystalline layer comprises a second hcp material having a <0002> preferred growth orientation and a second {0002} lattice parameter different from the first {0002} lattice parameter, wherein:

the first crystalline layer is from about 1 to about 1,000 nm thick and comprised of an fcc material selected from the group consisting of: Ag, Cu, Au, Ni, Pt, Pd, Al, Rh, Ir, Pb, Ca, Sr, Yb, and alloys based thereon;

the second crystalline layer is from about 1 to about 50 nm thick and comprised of a first hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, and alloys based thereon; and the third crystalline layer is from about 1 to about 50 nm thick and comprised of a second hcp material selected from the group consisting of: CoCrPt alloys or from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon.

According to a third preferred embodiment of the present invention:

the first crystalline layer comprises an hcp material having a <0002> preferred growth orientation and a {0002} lattice parameter;

the third crystalline layer comprises a first fcc material having a <111> preferred growth orientation and a second {111} lattice parameter different from the first {111} lattice parameter; and the second crystalline layer comprises a second fcc material having a <111> preferred growth orientation and a second {111} lattice parameter more closely matched to the {0002} lattice parameter than to the first {111} lattice parameter, wherein:

the first crystalline layer is from about 1 to about 1,000 nm thick and comprised of an hcp material selected from the group consisting of: Ru, Ti, Co, Re, Be, Mg, Sc, Zn, Se, Zr, Cd, Te, La, Hf, Os, Ti, Pr, Nd, Gd, Tb, Dy, Ho, Er, Tm, Lu, Y, and alloys based thereon;

the second crystalline layer is from about 1 to about 50 nm thick and comprised of a first fcc material selected from the group consisting of: Ag, Cu, Au, Ni, Pt, Pd, Al, Rh, Ir, Pb, Ca, Sr, Yb, and alloys based thereon; and the third crystalline layer is from about 1 to about 50 nm thick and comprised of a second fcc material selected from the group consisting of: Ag, Cu, Au, Ni, Pt, Pd, Al, Rh, Ir, Pb, Ca, Sr, Yb, and alloys based thereon.

According to a fourth preferred embodiment of the present invention:

the first crystalline layer comprises a first hcp material having a <0002> preferred growth orientation and a first {0002} lattice parameter;

the second crystalline layer comprises a second hcp material having a <0002> preferred growth orientation and a second {0002} lattice parameter different from the first {0002} lattice parameter; and the third crystalline layer comprises an fcc material having a <111> preferred growth orientation and a {111} lattice parameter more closely matched to the second {0002} lattice parameter than to the first {0002} lattice parameter, wherein:

the first crystalline layer is from about 1 to about 1,000 nm thick and comprised of a first hcp material selected from the group consisting of: Ru, Ti, Co, Re, Be, Mg, Sc, Zn, Se, Zr, Cd, Te, La, Hf, Os, Ti, Pr, Nd, Gd, Tb, Dy, Ho, Er, Tm, Lu, Y, and alloys based thereon;

the second crystalline layer is from about 1 to about 50 nm thick and comprised of a second hcp material selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon; and the third crystalline layer is from about 1 to about 50 nm thick and comprised of an fcc material selected from the group consisting of: Ag, Cu, Au, Ni, Pt, Pd, Al, Rh, Ir, Pb, Ca, Sr, Yb, and alloys based thereon.

Each of the thin film layers 2A, 2B, 3, the component layers of intermediate layer 4', and 5 and the protective overcoat layer 11 may be formed by utilizing at least one physical vapor deposition (PVD) method selected from sputtering, reactive sputtering, vacuum evaporation, ion plating, ion beam deposition (IBD), and plasma deposition, or at least one chemical vapor deposition method selected from CVD, MOCVD, and PECVD; and lubricant topcoat layer 12 may be formed by utilizing at least one method selected from dipping, spraying, and vapor deposition.

According to a general scheme or procedure for fabricating the above-described preferred embodiments of the invention, a multiple layer interlayer structure 4' is formed by depositing, e.g., by sputtering, a crystalline first layer of an fcc material having a preferred <111> out-of-plane growth orientation and a {111} lattice parameter or an hcp material having a preferred <0002> out-of-plane growth orientation and a {0002} lattice parameter on the surface of magnetically soft underlayer 3, followed by deposition thereon of a second (i.e., intermediate) crystalline layer of an fcc material having a preferred <111> out-of-plane growth orientation and a {111} lattice parameter or an hcp material having a preferred <0002> out-of-plane growth orientation and a {[0002} lattice parameter.

The second (intermediate) crystalline layer may also be deposited by sputtering and grows coherently on the first crystalline layer and maintains either the preferred growth orientation or the lattice parameter of the first crystalline layer.

The third crystalline layer, which may also be deposited by sputtering, comprises an fcc material having a preferred <111> out-of-plane growth orientation and a {111} lattice parameter or an hcp material having a preferred <0002> out-of-plane growth orientation and a {0002} lattice parameter and maintains either the preferred growth orientation or the lattice parameter of the second (intermediate) crystalline layer.

In each instance, the preferred out-of-plane growth orientation of the material of the third crystalline layer is strengthened by insertion of the second (intermediate) crystalline layer having the aforementioned attributes or characteristics, vis-à-vis when the second (intermediate) crystalline layer is omitted. The preferred orientation can be determined by X-ray diffraction measurements including Bragg-Brentano (theta-2theta) and X-ray rocking curves. Strengthening of the preferred orientation can be confirmed by observing at least one of an increase in integrated peak intensity of the growth orientation peak of otherwise similarly deposited layers having the same thickness, and a decrease in the measured full width at half maximum (FWHM) of an X-ray rocking curve of the growth orientation peak.

The methods of the present invention are applicable to the fabrication of thin film structures having different innate "strengths" of the preferred crystal growth orientation, which "strengths" depend upon a number of factors, including substrate roughness and deposition method, as well as the materials utilized for the component layers. Generally, a film is considered strongly oriented in a single direction when the integrated intensity of the largest peak of the family of planes of the specified orientation is at least about 10 times greater than any other peak observed from the layer of the specified material. "Strong" orientation also generally implies an X-ray rocking curve FWHM less than ~10 degrees.

Reactive sputtering of the magnetically hard perpendicular recording layer 5 in an $Ar/O_2$ atmosphere is preferred when the latter comprises a Co-based <0002> out-of-plane growth oriented layer, in order to enable formation of an intergranular Co oxide. The target utilized for sputtering the magnetically hard Co-based recording layer may comprise Co with one or more added elements, selected from the group consisting of Pt, Cr, Ta, B, Cu, W, Mo, and Nb. The magnetic recording layer and the interlayer structures according to the invention may be formed at low temperatures, e.g., <~400°K., or grown at higher temperatures, generally >~420°K. and <~600°K. Other media according to the invention, e.g., FePt multi-layer superlattice media, require thermal processing at temperatures in excess of 600°K.

In summary, the compositions (i.e., materials), thicknesses, crystallographic types, and arrangements of the component layers of the non-magnetic interlayer structure 4' and the magnetic alloy-based, perpendicular hard magnetic recording layer 5 are selected as to act in concert to provide medium 20 with improved performance characteristics vis-à-vis medium 1, which improvement is largely attributable to the strong crystal growth orientation of perpendicular main recording layer 5 provided by the improved interlayer structures 4' of the present invention.

Thus, the present invention advantageously provides improved, high areal density, magnetic alloy-based perpendicular magnetic data/information and storage retrieval media including an improved non-magnetic interlayer which provides advantageous crystal lattice matching and orientation of the magnetic recording layer which afford improved media performance characteristics. The media of the present invention are especially useful when employed in conjunction with single-pole recording/retrieval transducer heads and enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A multiple layer structure comprising in overlying, contacting sequence:
   a first crystalline layer comprising a first fcc material having a <111> preferred growth orientation and a first {111} lattice parameter;
   a second crystalline layer comprising a second fcc material having a <111> preferred growth orientation and a second {111} lattice parameter different from said first {111} lattice parameter; and
   a third crystalline layer comprises an hcp material having a <0002> preferred growth orientation and a {0002} lattice parameter more closely matched to said second {111} lattice parameter than to said first {111} lattice parameter, wherein:
   said first fcc material is selected from the group consisting of: Ag, Au, Pt, Pd, Al, Rh, Ir, Pb, Ca, Sr, Yb, and alloys based thereon;
   said second fcc material is selected from the group consisting of: Ag, Cu, Au, Ni, Pt, Pd, Al, Rh, Ir, Pb, Ca, Sr, Yb, and alloys based thereon; and
   said hcp material is selected from the group consisting of: Ru, Ti, Co, Re, Be, Mg, Sc, Zn, Se, Zr, Cd, Te, La, Hf, Os, Ti, Pr, Nd, Gd, Tb, Dy, Ho, Er, Tm, Lu, Y, and alloys based thereon.

2. The multi-layer structure as in claim 1, wherein:
   said first crystalline layer is from about 1 to about 1,000 nm thick;
   said second crystalline layer is from about 1 to about 50 nm thick; and
   said third crystalline layer is from about 1 to about 50 nm thick.

3. The multiple layer structure as in claim 1, wherein said second crystalline layer provides one of said first and third crystalline layers with a stronger out-of-plane preferred growth orientation than if each of said first and third crystalline layers are in overlying contact.

4. The multiple layer structure as in claim 1, wherein:
   (a) said first crystalline layer has a first, closest packed plane, nearest neighbor atomic spacing;
   (b) said second crystalline layer has a second, closest packed plane, nearest neighbor atomic spacing; and
   (c) said third crystalline layer has a third closest packed plane, nearest neighbor atomic spacing, wherein:
   said first and said third closest packed plane, nearest neighbor atomic spacings are different; and
   the atomic spacing mismatch between said second closest packed plane, nearest neighbor atomic spacing of said second crystalline layer and the closest packed plane, nearest neighbor atomic spacing of one of said first and third crystalline layers is less than the mismatch between the closest packed plane, nearest neighbor atomic spacings of said first and third crystalline layers, whereby:
   said third crystalline layer in overlying contact with said second crystalline layer has a stronger preferred out-of-plane growth orientation than if said third crystalline layer is in overlying contact with said first crystalline layer.

5. The multiple layer structure as in claim 4, wherein:
   said third crystalline layer in overlying contact with said second crystalline layer has a stronger preferred hexagonal close-packed (hcp) <0002> out-of-plane growth orientation than if said third crystalline layer is in overlying contact with said first crystalline layer.

6. A perpendicular magnetic recording medium, comprising the multiple layer structure of claim 5 and a perpendicular magnetic recording layer comprising a magnetic material with a strong preferred hcp <0002> or fcc <111> out-of-plane growth orientation in overlying contact with said third crystalline layer.

7. The perpendicular magnetic recording medium as in claim 6, wherein:
   said perpendicular magnetic recording layer comprises at least one magnetic material with a strong hcp <0002> out-of-plane growth orientation, selected from the group consisting of: Co-based alloys, CoCrPt(SiO$_2$), other CoPtO-containing alloys, CoCrPtB, other CoCrPt-containing alloys, and other Co-based alloys, or at least one magnetic material with a strong fcc <111> out-of-plane growth orientation, selected from the group consisting of a multi-layer superlattice structure including a bi-layer comprising a Co-based alloy layer and a layer including at least one of Pt and Pd, a multi-layer superlattice structure including a bi-layer comprising an Fe-based alloy layer and a layer including at least one of Pt and Pd, and an L$_{10}$ structure selected from FePt, CoPt, FePd, and CoPd materials with and without at least one alloying element.

8. A perpendicular magnetic recording medium, comprising:
(a) a non-magnetic substrate having a surface;
(b) a layer stack formed over said substrate surface, said layer stack comprising, in overlying sequence from said substrate surface:
(i) a magnetically soft underlayer;
(ii) a multiple layer interlayer structure for strengthening a preferred out-of-plane growth orientation of a layer of a perpendicular magnetic recording material formed thereon; and
(iii) a perpendicular magnetic recording layer having a strong preferred hcp <0002> or fcc <111> out-of-plane growth orientation;
wherein said multiple layer interlayer structure comprises, in overlying, contacting sequence from a surface of said magnetically soft underlayer:
(1) a first crystalline layer of a material having a first crystal structure, a first preferred growth orientation and a first, closest packed plane, nearest neighbor atomic spacing;
(2) a second crystalline layer of a material having a second crystal structure, a second preferred growth orientation, and a second, closest packed plane, nearest neighbor atomic spacing; and
(3) a third crystalline layer of a material having a third crystal structure, a third preferred growth orientation, and a third closest packed plane, nearest neighbor atomic spacing, wherein:
(I) said first and said third crystal structures are different;
(II) said first and said third closest packed plane, nearest neighbor atomic spacings are different;
(III) said second crystal structure is of the same type as said first crystal structure; and
(IV) the atomic spacing mismatch between said second closest packed plane, nearest neighbor atomic spacing of said second crystalline layer and the closest packed plane, nearest neighbor atomic spacing of said third crystalline layer is less than the mismatch between the closest packed plane, nearest neighbor atomic spacings of said first and third crystalline layers, whereby:
said third crystalline layer in overlying contact with said second crystalline layer has a stronger preferred out-of-plane growth orientation than if said third crystalline layer is in overlying contact with said first crystalline layer;
the first crystalline layer comprising a first fcc material having a <111> preferred growth orientation and a first {111} lattice parameter;
the second crystalline layer comprising a second fcc material having a <111> preferred growth orientation and a second {111} lattice parameter different from said first {111} lattice parameter; and
the third crystalline layer comprises an hcp, material having a <0002> preferred growth orientation and a {0002} lattice parameter more closely matched to said second {111} lattice parameter than to said first {111} lattice parameter, wherein:
said first fcc material is selected from the group consisting of: Ag, Au, Pt, Pd, Al, Rh, Ir, Pb, Ca, Sr, Yb, and alloys based thereon:
said second fcc material is selected from the group consisting of: Ag, Cu, Au, Ni, Pt, Pd, Al, Rh, Ir, Pb, Ca, Sr, Yb, and alloys based thereon; and
said hcp material is selected from the group consisting of: Ru, Ti, Co, Re, Be, Mg, Sc, Zn, Se, Zr, Cd, Te, La, Hf, Os, Tl, Pr, Nd, Gd, Tb, Dy, Ho, Er, Tm, Lu, Y, and alloys based thereon.

9. The recording medium as in claim 8, wherein:
said third crystalline layer in overlying contact with said second crystalline layer has a stronger preferred hexagonal close-packed (hcp) <0002> out-of-plane growth orientation than if said third crystalline layer is in overlying contact with said first crystalline layer.

10. The recording medium as in claim 9, wherein:
said first crystalline layer is from about 1 to about 1,000 nm thick;
said second crystalline layer is from about 1 to about 50 nm thick; and
said third crystalline layer is from about 1 to about 50 nm thick.

11. The recording medium as in claim 9, wherein:
said non-magnetic substrate comprises at least one material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof;
said magnetically soft underlayer comprises at least one material selected from the group consisting of Fe-based alloys, Co-based alloys, and Ni-based alloys; and
said perpendicular magnetic recording layer comprises at least one magnetic material with a strong hcp <0002> out-of-plane growth orientation, selected from the group consisting of: Co-based alloys, CoCrPt(SiO$_2$), other CoPtO-containing alloys, CoCrPtB, other CoCrPt-containing alloys, and other ordered or disordered Co-based alloys, or at least one magnetic material with a strong fcc <111> out-of-plane growth orientation, selected from the group consisting of a multi-layer superlattice structure including a bi-layer comprising a Co-based alloy layer and a layer including at least one of Pt and Pd, a multi-layer superlattice structure including a bi-layer comprising an Fe-based alloy layer and a layer including at least one of Pt and Pd, and an L$_{10}$ structure selected from FePt, CoPt, FePd, and CoPd materials with and without at least one alloying element.

* * * * *